United States Patent [19]

Karmeli et al.

[11] Patent Number: 4,817,875
[45] Date of Patent: Apr. 4, 1989

[54] FLEXIBLE PIPE FOR TRICKLE IRRIGATION

[76] Inventors: David Karmeli, 2 Yaldei Teheran Street; Gideon Peri, 15 Mivtza Yonatan Street, both of Haifa, Israel

[21] Appl. No.: 99,102
[22] Filed: Sep. 21, 1987
[51] Int. Cl.$^4$ ............................................... B05B 15/00
[52] U.S. Cl. ..................................... 239/542; 239/547
[58] Field of Search ............................... 239/266–269, 239/542, 547, 562, 567, 572; 138/43, 114

[56] References Cited

U.S. PATENT DOCUMENTS

| 3,887,138 | 6/1975 | Gilead | 239/542 |
| 4,105,162 | 8/1978 | Drori | 138/43 X |
| 4,209,133 | 6/1980 | Mehoudar | 239/547 X |
| 4,366,926 | 1/1983 | Mehoudar | 239/542 |
| 4,452,397 | 6/1984 | Barton | 239/547 X |
| 4,655,397 | 4/1987 | Gorney | 239/547 X |

OTHER PUBLICATIONS

Israeli Application No. 77875 (Specification, Claims, pp. 1–19 and FIGS. 1–9b).

Primary Examiner—Andres Kashnikow
Assistant Examiner—Patrick N. Burkhart
Attorney, Agent, or Firm—Frishauf, Holtz, Goodman & Woodward

[57] ABSTRACT

A flexible pipe contains trickle irrigation emitters positioned inside the pipe. It consists of an inner plastics tube provided with spaced chambers and an outer plastics tube fused with the inner tube and covering all chambers, the outer tube being perforated by water outlets in respect of each chamber. The bottom of each chamber is perforated by water inlet openings, and each chamber contains a rigid, oblong emitter unit having a recessed top surface with a raised rim tightly fused to the outer tube; the bottom surface of the emitter unit is flat and parallel to the chamber bottom and contains a flow-restricting duct which communicates at one end with the chamber bottom and at the other with the recessed top surface. A flat, flexible wafer is positioned between the chamber bottom and the emitter unit, adapted to be urged into the flow-restricting duct by water pressure in the pipe, whereby increased pressure reduces the cross-section of the duct and increases the flow resistance, in a manner that the output remains constant over a wide range of pressures.

10 Claims, 3 Drawing Sheets

FLEXIBLE PIPE FOR TRICKLE IRRIGATION

BACKGROUND OF THE INVENTION

The invention relates to a flexible pipe used for trickle irrigation of plants and its manufacture by an extrusion process. It relates particularly to a plastic pipe provided with spaced-apart trickle irrigation emitter means integral with the pipe wall.

Conventional drip irrigation means consist of a pipe provided with a plurality of discrete emitter units which are inserted into, or otherwise fastened to the inside or the outside of the pipe wall by gluing or otherwise. There exist untold types of emitters, all having the common purpose of presenting a given resistance to the water flow, so as to reduce it to a trickle which serves to irrigate each of a plurality of spaced-apart plants by the same amount of water.

Practically all trickle irrigation emitters are characterized by a flow path in the shape of a long water duct of relatively wide cross section and of an intricate, preferably labyrinth pattern, with the aim to preventing clogging of the duct on the one hand, while, creating the required flow resistance, on the other hand.

It has been suggested to provide emitters which are incorporated in or with the pipe wall, for instance in the form of longitudinal cavities of a given length, communicating at their respective two ends with the pipe interior and the outside. Another kind of emitter pipe comprises a labyrinthine sleeve closely attached to the outside of the pipe wall and extending along it over a predetermined length.

In our Israeli Patent Specification No. 77875 we have disclosed a trickle irrigation pipe provided with evenly spaced emitters, which consist of an inner tube of an extruded plastics comprising a plurality of inwardly protruding, longitudinally spaced wells, and of an outer tube of the same or similar material covering the inner tube, whereby the wells are covered by the outer tube and thus form closed chambers. One flexible wafer each is movably positioned in each chamber, each wafer containing a flow-restricting duct on the side facing the outer tube and a passage extending through the wafer at a first end of the flow-restricting duct. The chamber communicates with the pipe interior through water inlet openings in its bottom portion, and with the atmosphere by means of a hole in the outer tube opposite the second end of the flow-restricting duct.

Water entering the chamber from the pipe through the inlet openings urges the flexible wafer towards the top portion of the chamber formed by the outer tube. Increasing water pressure deforms the wafer, thereby reducing the cross section of the flow-restricting duct. The material of the wafer and the shape and cross section of the duct are so selected that the water through-flow remains substantially constant for a given pressure range, say between 1 to 4 bars.

The pipe is manufactured by extruding the inner tube, impressing the wells into the still-soft tube wall, and perforating the bottom of the well at the same time to form a number of inlet openings; inserting a flexible wafer into each well and guiding the tube through a second extruder, effecting covering the inner tube together with the wells—which contain the flexible wafers—by an outer tube of the same material which fuses with the surface of the inner tube and completely unites with it to form a strong irrigation pipe. Water outlet holes are subsequently punched into the outer tube at the points of the outlet ends of the flow-restricting ducts in the water surfaces.

Although each of the trickle emitters along a pipe emits a uniform water output, it has been experienced that the outputs of different emitters along the pipe differ from each other, and it was found that these different outputs were caused by the different configuration of the chamber top formed by the tubular cover. The outer tube sometimes covers the chamber in cylindrical shape and on the other occasions is stretched flat across the wells, thus forming planar chamber tops. The different shapes influence the deformation of the flexible wafers and of the flow-restricting ducts and, accordingly, the water output of differently deformed wafers.

It is, therefore, the main object of the present invention to provide a uniform contact surface for the flexible wafers, thus ensuring uniform deformation of each wafer and each flow restricting duct, while retaining the principle of the double-walled pipe and of the closed chamber incorporated in the pipe wall between an outer and an inner tube fused together.

SUMMARY OF THE INVENTION

A preferred emobdiment of the trickle irrigation pipe, according to the present invention, comprises an inner plastics tube provided with spaced-apart impressed longitudinal wells which are covered by an outer tubular cover of a material capable of fusing with the inner tube, effecting formation of closed chambers by covering the tops of the wells. The chamber bottom is perforated by at least one water inlet opening, while an outlet opening perforates the chamber top. The chamber is preferably of an oblong rectangular plan and contains a substantially rigid dripper unit of corresponding plan, as well as a flat flexible wafer in contact with the flat underside of the dripper unit and with the bottom of the chamber respectively. The dripper unit is provided with a raised rim in contact with the inside of the outer tube and intimately connected thereto by fusion, the area inside the raised rim being recessed so as to form a low-pressure basin underneath the chamber top. The—otherwise flat—underside of the dripper unit is recessed in the shape of a meandering or labyrinthine flow-restricting duct extending to one end of the oblong dripper unit and stopping short off the other end, a passage in the form of a hole penetrating the thickness of the unit from the end of the duct into the basin on top. The basin communicates with the outside through a water outlet opening penetrating the outer tube. The wafer is preferably held in position on the underside of the dripper unit by lugs or rim portions extending down-wardly from the main body of the unit.

The flow restricting duct may be of any configuration as known to the art, a preferred embodiment being a zigzag shape with an enlarged recess surrounding the passage through the dripper unit. The elastic wafer covers the entire duct as well as the recess, except for a short duct portion at the end remote from the recess and the through-going passage, this portion serving to permit water from the inlet openings to reach the duct.

The bottom of the chamber is recessed in all those embodiments, wherein the wafer contacts the bottom, is recessed in the region of the inlet openings in order to prevent their obstruction by the bottom surface of the wafer.

As in the trickle irrigation pipe described in our patent specification No. 77875, the outer cover may be in the form of a complete outer tube, in the form of a short sleeve of a length sufficient to cover the individual wells to form chambers, or in the form of patches of plastics sheeting covering the well openings only.

It is, however, pointed out that covering the entire inner tube by means of an outer tube fusing therewith, is advantageous for the reason that a thin inner tube may be employed which is subsequently reinforced by the outer tube, so as to be capable to withstand the water pressure.

SHORT DESCRIPTION OF THE DRAWINGS

FULL DESCRIPTION OF THE DRAWINGS

Figure 1:
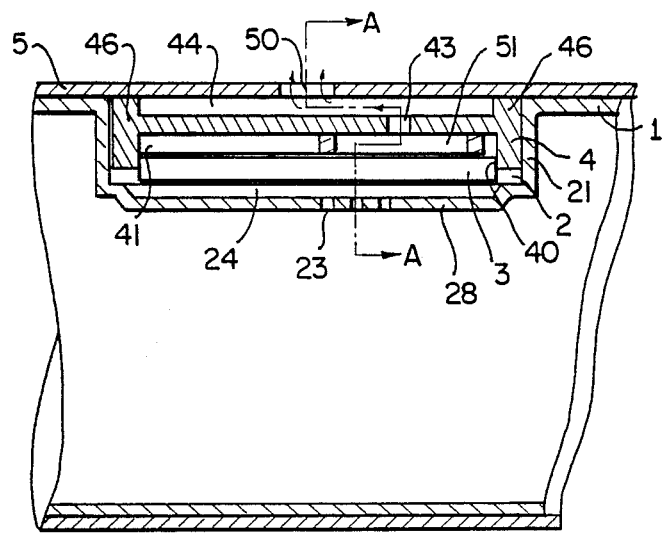
FIG. 1 is a longitudinal section through a trickle irrigation emitter in the wall of an irrigation pipe.
Figure 2:
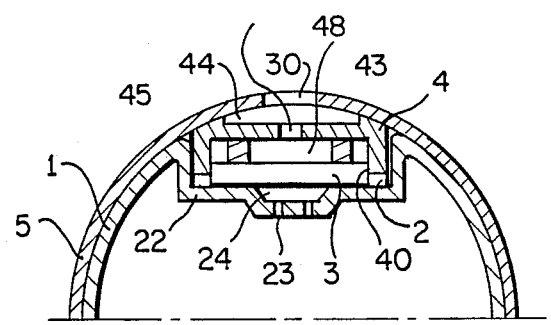
FIG. 2 is a section along line A—A of FIG. 1.
Figure 3:
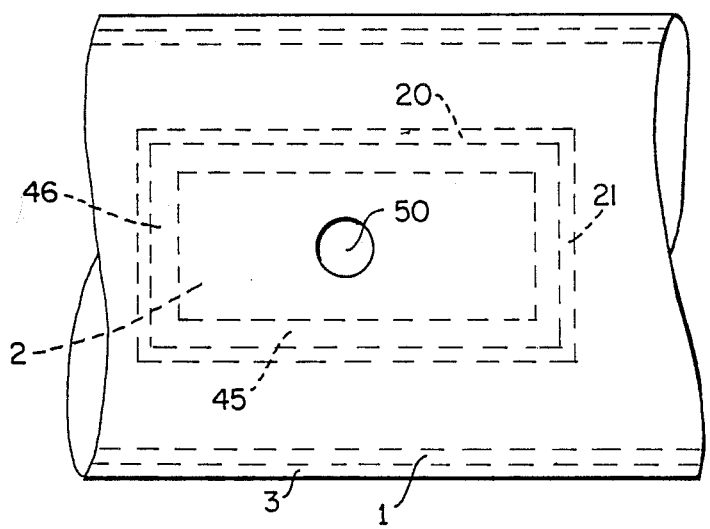
FIG. 3 is a top view of the pipe of FIG. 1.
Figure 7:
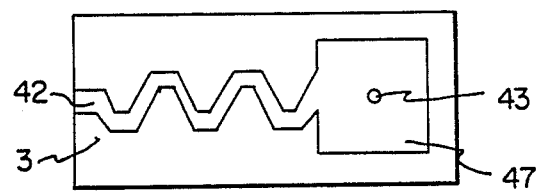
FIG. 7 shows a flow restricting duct in the shape of a meander.
Figure 8:
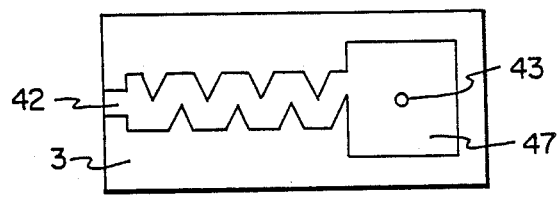
FIG. 8 shows a flow restricting duct in the form of a symmetric labyrinth.
Figure 9:
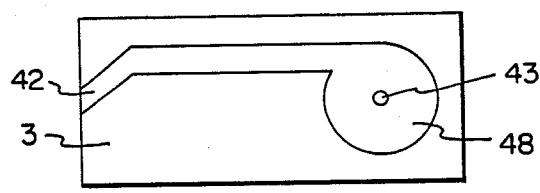
FIG. 9 shows a straight flow restricting duct extending into a circular recess in tangential direction, adapted to create a vortex flow.

With reference to FIGS. 1, 2 and 3: An inner plastics tube is impressed, at equal intervals, with rectangular, inwardly protruding wells 2, one of which is visible in the drawings. The well is composed of two longitudinal walls 20, two transverse walls 21, and a flat bottom 22. The bottom s perforated by a number of water inlet holes 23—in the present case six—which are surrounded by a recessed area 24 in the bottom f the well, serving to keep the holes 23 clear of contact with the flexible wafer 3. This wafer is relatively thin, of rectangular plan, and in inserted into a rectangular recess 40 in the bottom portion of a rigid dripper unit 4 which is slightly larger than the wafer, thus presenting a water passage 41 at the end of the recess. The recess is provided with a flow-restricting duct 42, various embodiments of which are shown in FIGS. 7 through 9. The duct starts at the water passage 41 and ends short off the end of the wafer 3. At the end of this duct 42, the dripper unit is vertically perforated by a hole 43 which connects the duct with the upper surface of the dripper unit. The upper surface is in the shape of a rectangular basin 44, surrounded by a raised rim comprising two longitudinal portions 45 and two transverse portions 46. The dripper unit is of a material which fuses readily with the outer tubular cover 5 while this is extruded over the inner tube 1, whereby the basin 44 is completely enclosed. The outer tube also fuses completely with the inner tube, thus converting the well 2 into a closed chamber having a vaulted roof, which is perforated by a water outlet opening 50.

The action of each trickle emitter is as follows: As soon as the pipe fills with water pressure, water enters the well—or chamber—2 through the inlet openings 23 and urges the wafer 3 into the recess 40 of the dripper unit. Water now flows through the space between the wafer and the bottom 22 through the passage 41 along the duct 42, from where it emerges into the basin 44 through the hole 43. From here water flows to the outside of the pipe through the outlet opening 50. The drawings show the state of the wafer at low water pressure.

With increasing water pressure the wafer is pressed into the duct 42, whereby the cross section of duct 42 is gradually reduced thereby increasing its resistance to the water flow. This feature is not novel and is well known and employed with existing trickle irrigation emitters. The shape and cross section of the flow restricting duct and the material and size of the wafer have to be calculated and designed by experiments and tests in such a manner that the through-flow of water remains substantially constant over a given range of pressure.

FIG. 6, 7, 8 and 9 show some embodiments of flow restricting ducts, and it will be understood that each shape of duct requires a wafer of predetermined size, thickness and elasticity. These figures also show that the area around the hole 43 is in the form of a recess 47 of larger dimensions than the width of the ducts. In FIG. 9 the duct leads tangentially into a circular recess 48, serving to create vortex effects which cause a considerable flow resistance.

Figure 4:
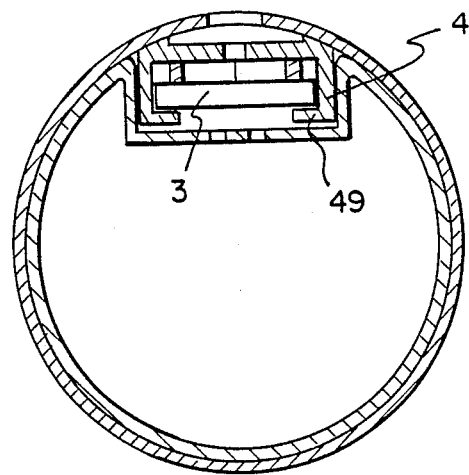
FIG. 4 shows a modification of the dripper unit of FIGS. 1 and 2, provided with lugs serving to hold the flexible water in position.

Since the dripper unit and the wafer are to be inserted into the well as one unit, while the inner tube travels between the first extruder to the second extruder applying the outer tubular cover, it is important that the two are not separated during this operation. FIG. 4, therefore, shows a manner of holding the wafer in position in the form of hooks or lugs 49 extending downwardly from the dripper unit and gripping the longitudinal edges of the wafer.

Figure 5:
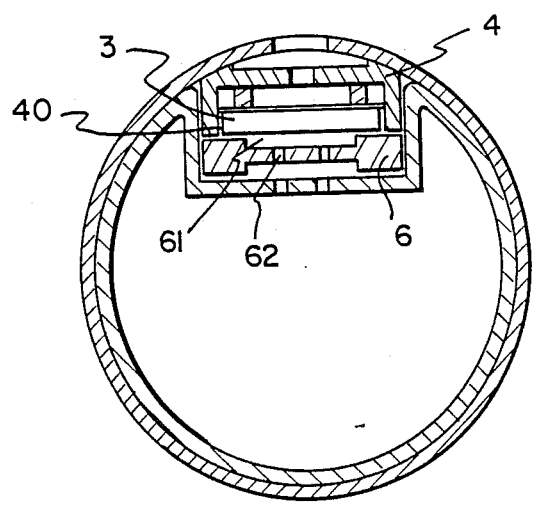
FIG. 5 shows another modification of the dripper unit of FIGS. 1 and 2, provided with an attached perforated cover for holding the flexible wafer in position.

Another method of holding the wafer 3 in position is shown in FIG. 5. Herein a perforated plate 6 is attached to the underside of the dripper unit 4, covering the recess 40 and thus preventing the escape of the wafer. The plate is longitudinally recessed (61) and perforated by holes 62, permitting free water circulation along the wafer surface.

Other means may be employed for holding the wafer in position, while the unit is inserted into the well, but in most cases the design of the dripper unit and wafer as shown in FIG. 2, utilizing the elasticity of the wafer to hold itself in the recess, will be sufficient. It is evident that after insertion the wafer is held in the recess by its proximity to the bottom 22 of the well.

Figure 10:
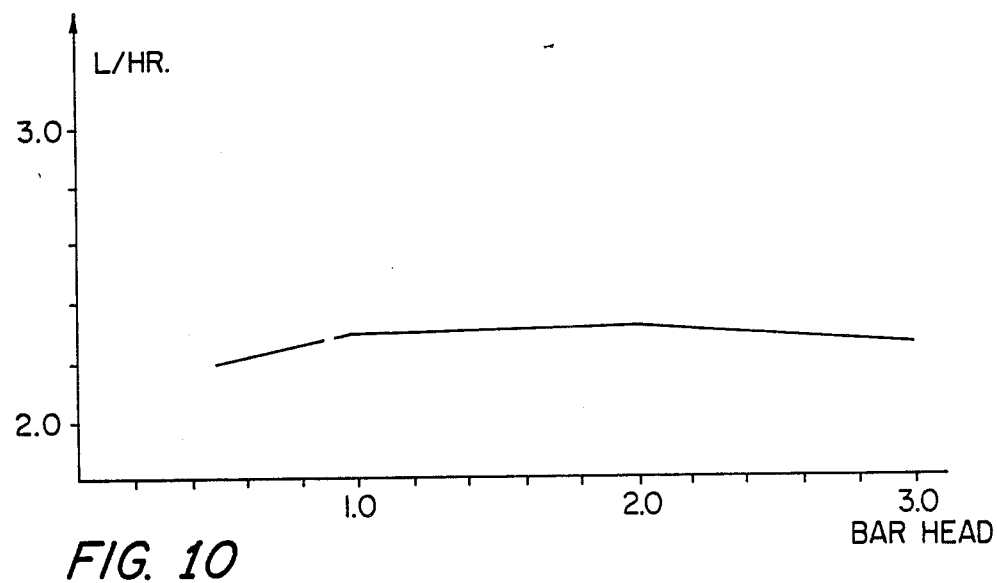
FIG. 10 shows a test curve of an emitter unit.

FIG. 10 shows the results of tests carried out with one emitter in a flexible pipe, having the following relevant dimensions: The wafer had a length of 13 mm, a width of 6 mm and a thickness of 0.8 mm. The material was EPDM-rubber of 40 shore hardness.

Figure 6:
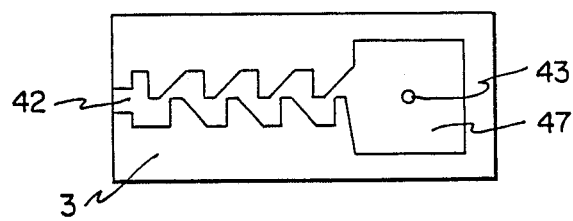
FIG. 6 shows a flow restricting duct in the shape of an asymmetric labyrinth.

The flow-restricting duct was in the shape of a labyrinth as shown in FIG. 6, of a median width of 1 mm and a depth of 0.7 mm.

FIG. 10 shows clearly that the output varies only slightly between pressures between 1 and 3 bar, which are the pressures mostly employed with trickle irrigation installations.

We claim:

1. A trickle irrigation pipe provided with longitudinally spaced trickle irrigation emitters in the shape of oblong chambers comprising:
    an inner plastics tube provided with a plurality of spaced-apart oblong wells impressed into said tube and extending inwardly, and a sheet material capable of fusing with the material of said inner tube covering each said well so as to form a top cover of each said chamber, wherein the bottom f each said chamber is perforated by at least one water inlet opening and wherein said top cover is perforated by a water outlet opening;

a substantially rigid dripper unit of oblong shape of a size coextensive with said chamber, said dripper unit having a recessed top surface surrounded by a raised rim tightly connected to said top cover by fusing and a substantially flat bottom surface recessed in parts by a flow restricting duct, said duct having a first end coextensive with one end of said dripper unit and a second end short of the second end of said dripper unit, a flow passage perforating said dripper unit from said second end of said duct to said recess in said upper surface;

a flat, flexible wafer positioned in the bottom of said chamber and contacting said bottom surface of said dripper unit, said wafer being of shorter length than said bottom surface to permit water to flow from said water inlet opening into said first end of said flow-restricting duct;

said wafer and said flow restricting duct being so designed that water pressure acting on the underside of said wafer and urging it into said flow-restricting duct reduces the cross section of said duct in such a proportion as to effect a uniform output of said trickle emitter within a predetermined pressure range, water flowing at reduced pressure from the second end of said duct through said flow passage to the top of said dripper unit to the outside through said water outlet in said chamber top cover.

2. The trickle irrigation pipe of claim 1, wherein said sheet material covering said wells in said inner tube is in the shape of an outer tube covering the entire inner tube and fusing therewith to form a pressure resisting pipe.

3. The trickle irrigation pipe of claim 1, wherein said sheet material covering said wells in said inner tube is in the form of a plurality of tubular sleeves covering said inner tube in the vicinity of said wells only.

4. The trickle irrigation pipe of claim 1 wherein the bottom f each said chamber is recessed in the area around said at least one inlet opening to effect free flow along the bottom surface of said wafer.

5. The trickle irrigation pipe of claim 1 wherein the underside of said dripper unit is provided with means for holding said wafer in position close to said flow-restricting duct.

6. The trickle irrigation pipe of claim 1 wherein said flow-restricting duct in said dripper unit is of enlarged width at its second end in the area around said flow passage.

7. The trickle irrigation pipe of claim 1 wherein said flow restricting duct has a labyrinthine shape.

8. The trickle irrigation pipe of claim 1 wherein said flow restricting duct has a zigzag shape.

9. The trickle irrigation pipe of claim 1 comprising chambers, dripper units and wafers of substantially rectangular shape.

10. The trickle irrigation pipe of claim 1 wherein said outlet opening connects said recessed top surface of said dripper unit with the outside.

* * * * *